United States Patent
Vogt et al.

(10) Patent No.: US 10,596,933 B2
(45) Date of Patent: Mar. 24, 2020

(54) METHOD FOR MOUNTING A BACKREST STRUCTURE OF A VEHICLE REAR SEAT, PIVOT SUPPORT OF A FOLD-OVER BACKREST STRUCTURE OF A VEHICLE REAR SEAT

(71) Applicant: Adient Luxembourg Holding S.à.r.l., Luxembourg (LU)

(72) Inventors: Adolf Vogt, Alsenz (DE); Lars Kramm, Trippstadt (DE); Ulrich Becker, Kusel (DE)

(73) Assignee: Adient Luxembourg Holding S.à r.l., Luxembourg (LU)

( * ) Notice: Subject to any disclaimer, the term of this patent is extended or adjusted under 35 U.S.C. 154(b) by 188 days.

(21) Appl. No.: 15/527,113

(22) PCT Filed: Nov. 10, 2015

(86) PCT No.: PCT/EP2015/076198
§ 371 (c)(1),
(2) Date: May 16, 2017

(87) PCT Pub. No.: WO2016/078965
PCT Pub. Date: May 26, 2016

(65) Prior Publication Data
US 2019/0016239 A1    Jan. 17, 2019

(30) Foreign Application Priority Data

Nov. 17, 2014  (DE) .................. 10 2014 223 369
Feb. 5, 2015    (DE) .................. 10 2015 202 078

(51) Int. Cl.
*B60N 2/015*   (2006.01)
*B60N 2/20*    (2006.01)
(Continued)

(52) U.S. Cl.
CPC .......... *B60N 2/3013* (2013.01); *B60N 2/015* (2013.01); *B60N 2/20* (2013.01); *B60N 2/206* (2013.01); *B60N 2/366* (2013.01); *B60N 2205/35* (2013.01)

(58) Field of Classification Search
CPC .......... B60N 2/015; B60N 2/20; B60N 2/206
(Continued)

(56) References Cited

U.S. PATENT DOCUMENTS 4,368,557  A  *  1/1983  Inasawa .............. B60N 2/015
                                                       16/263
5,803,549  A     9/1998  Bolsworth et al.
(Continued)

FOREIGN PATENT DOCUMENTS

DE    296 12 248 U1    10/1996
DE    196 06 780 A1     8/1997
(Continued)

OTHER PUBLICATIONS

FR-2663889-A1 English Translation (Year: 1992).*

*Primary Examiner* — Kyle R Grabowski
(74) *Attorney, Agent, or Firm* — Marshall & Melhorn, LLC

(57) ABSTRACT

A method is provided for mounting a backrest structure (1) of a vehicle rear seat. The method includes the following steps: arranging a bearing bush (15) on a cylindrical bearing pin (11) provided in a lower lateral corner segment of a backrest structure (1), inserting the bearing bush (15) into a cut-out (17) of a body-side backrest bearing (2a, 2b), pivoting the backrest structure (1) inserted into the backrest bearing (2a, 2b) forward about a bearing axis (12) of the bearing pin (11) until a blocking segment (22b, 122b) of the bearing bush (15) locks in and/or engages behind a blocking element (22a, 122a) of the backrest bearing (2a, 2b). A pivot (Continued)

support of a fold-over backrest structure (1) of a vehicle rear seat is also provided.

17 Claims, 8 Drawing Sheets

(51) Int. Cl.
  *B60N 2/30* (2006.01)
  *B60N 2/36* (2006.01)
(58) Field of Classification Search
  USPC .......................................... 297/378.1–378.14
  See application file for complete search history.

(56) References Cited

U.S. PATENT DOCUMENTS

| | | | |
|---|---|---|---|
| 9,452,690 B2 * | 9/2016 | Kamper | .................... B60N 2/36 |
| 2017/0320410 A1 * | 11/2017 | Cesarano | ............... B60N 2/015 |

FOREIGN PATENT DOCUMENTS

| | | | | |
|---|---|---|---|---|
| DE | 196 49 077 A1 | | 5/1998 | |
| DE | 29923174 U1 | * | 5/2000 | ............. B60N 2/015 |
| DE | 101 58 595 C1 | | 7/2003 | |
| DE | 102 15 224 C1 | | 10/2003 | |
| DE | 10215224 C1 | * | 10/2003 | ............. B60N 2/015 |
| DE | 10 2004 062 517 A1 | | 7/2006 | |
| DE | 102010051451 B3 | * | 1/2012 | ............. B60N 2/015 |
| DE | 202014104687 U1 | * | 10/2014 | ............. B60N 2/015 |
| EP | 1 630 432 B1 | | 12/2008 | |
| FR | 2 663 889 A1 | | 1/1992 | |
| FR | 2663889 A1 | * | 1/1992 | ........... B60N 2/3013 |
| FR | 2775228 A1 | * | 8/1999 | ............. B60N 2/015 |

* cited by examiner

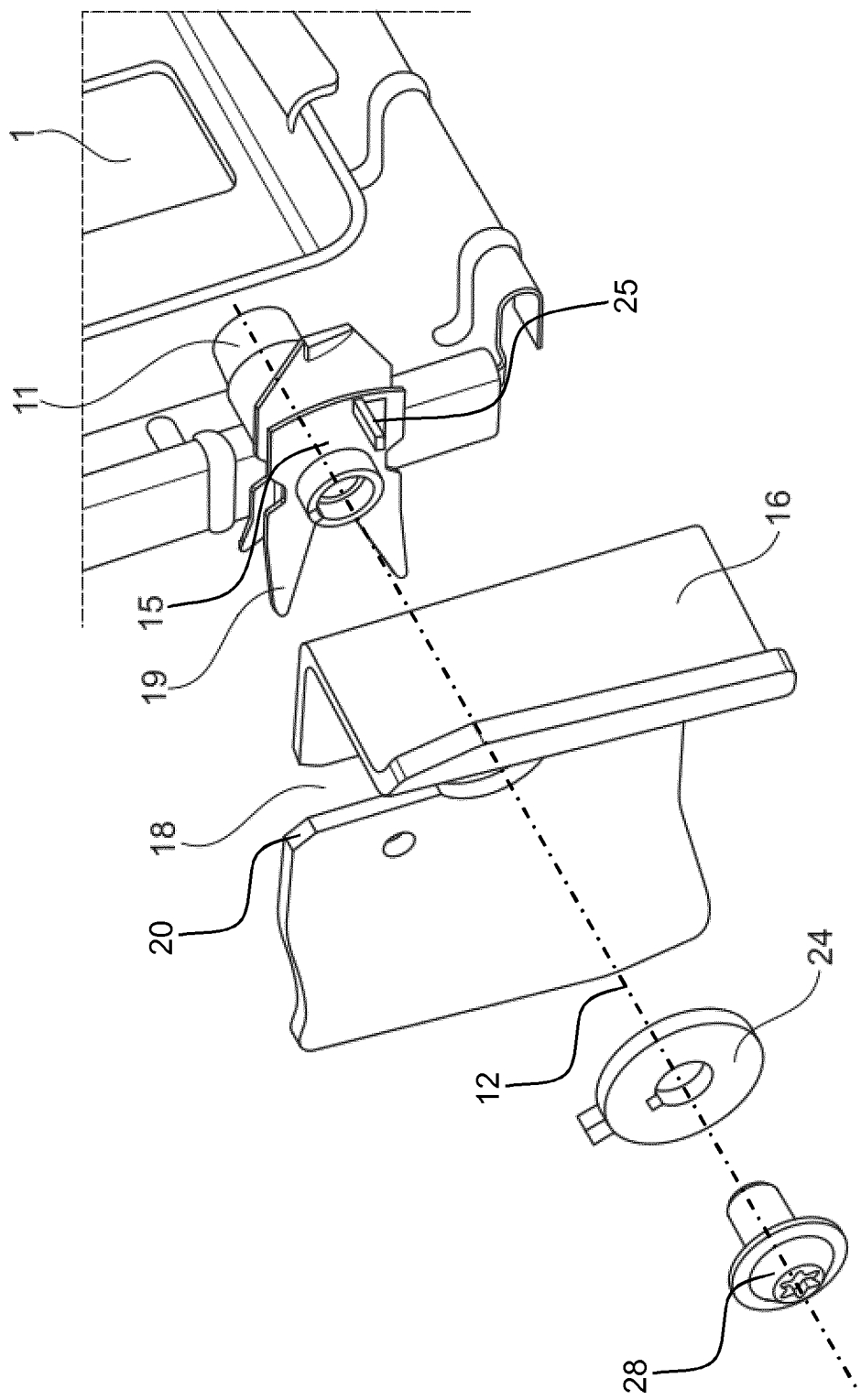

METHOD FOR MOUNTING A BACKREST STRUCTURE OF A VEHICLE REAR SEAT, PIVOT SUPPORT OF A FOLD-OVER BACKREST STRUCTURE OF A VEHICLE REAR SEAT

CROSS REFERENCE TO RELATED APPLICATIONS

This application is a United States National Phase Application of International Application PCT/EP2015/076198, filed Nov. 10, 2015, and claims the benefit of priority under 35 U.S.C. § 119 of German Applications 10 2014 223 369.0, filed Nov. 17, 2014 and 10 2015 202 078.9, filed Feb. 5, 2015, the entire contents of which are incorporated herein by reference.

FIELD OF THE INVENTION

The invention relates to a method for mounting a backrest structure of a vehicle rear seat, and to a pivot support of a backrest structure of a vehicle rear seat, which backrest structure can be folded over.

BACKGROUND OF THE INVENTION

According to DE 296 12 248 U1, a pivot bearing is known which has a double-walled receptacle with guide slots for both bearing pins of a motor vehicle rear seat backrest. In each case one spring-prestressed pivot lever is mounted between the two walls of each receptacle, which pivot lever engages over the bearing pin in its mounted position. The jaw of the pawl-shaped lever is designed in such a way that the bearing pin is held in its receptacle without play and without rattling as a consequence of the spring force which acts on the lever. A pivot bearing of this type is comparatively complicated.

Furthermore, DE 101 58 595 C1 discloses a backrest which is mounted such that it can be pivoted about a pivot axis by means of two rotary bearing points. Here, one of the rotary bearing points is configured such that it can be moved in the axial direction, and is held without play by means of a spring.

DE 10 2004 062 517 A1 has disclosed a fastening apparatus for a rear seat backrest which is configured such that it can be folded forward and can be lifted out, having a bearing which is arranged in a bearing housing which is fixed to the chassis, and having a bearing head which is connected fixedly to the rear backrest part, is of cylindrical configuration, has flattened portions on opposite sides, is arranged in a positively locking manner in a receptacle of the bearing, and can be lifted out of the receptacle in a defined pivot position which differs from the normal use position. The receptacle is arranged rotatably in the bearing housing.

U.S. Pat. No. 5,803,549 A has disclosed a self-locking clevis pin which has a bar which can be pivoted along a planar surface of a structural element in the vicinity of a pin receiving slot; without a separate prestressing spring acting on the locking means, in order to keep the latter closed. A lug snaps into a holding hole in the completely closed position of the bar, in order to lock the locking means of the clevis pin in the pin receiving slot.

Further embodiments of pivot bearings of the generic type for a backrest structure of a vehicle rear seat, which backrest structure can be folded over, are known, for example, from FR 2 663 889 A1, EP 1 630 432 B1 and DE 196 49 077 A1.

SUMMARY OF THE INVENTION

The invention is based on an object of improving and/or providing a method for mounting a backrest structure of a vehicle rear seat, and a pivot support of a backrest structure of a vehicle rear seat, which backrest structure can be folded over, in particular of simplifying mounting of the backrest structure, and a pivot support of the backrest structure, in such a way that the mounting can be effected by a worker who carries out the mounting operation, while dispensing with a necessity for the use of further tools.

According to the invention, said object is achieved by way of a method having the following steps:
- arrangement of a bearing bush on a cylindrical bearing pin which is provided in a lower lateral corner section of the backrest structure,
- introduction of the bearing bush into a recess of a vehicle body-side backrest bearing,
- pivoting out of the backrest structure which is introduced into the backrest bearing about a bearing axis of the bearing pin until a blocking section of the bearing pin latches into a latching element of the backrest bearing and/or engages behind it.

Here, the introduction of the bearing bushes into the backrest bearing preferably takes place from above in a straight, downwardly directed movement. Here, the backrest structure is preferably oriented perpendicularly with respect to a vehicle floor of the vehicle, in which the backrest structure is mounted.

The method according to the invention provides the advantage of simplifying the handling of the backrest structure for the responsible worker in the manufacturing plant during the mounting of the backrest structure. By way of the method according to the invention, the backrest structure can be mounted in a time-saving manner by way of only a few hand movements and by way of simple means. Furthermore, the bearing bush in the backrest bearing acts as an automatic securing means of the mounted backrest when the blocking section of the bearing bush is latched in the blocking element of the backrest bearing and/or engages behind it.

According to a first exemplary embodiment of the method, an inner backrest bearing being arranged between two vehicle body-side outer backrest bearings, fixing of the backrest structure on the inner backrest bearing takes place in the pivoted-out state of the backrest structure by means of a holding element which can be screwed. Here, the inner backrest bearing is preferably configured in such a way that it receives that part of the backrest structure which is provided for mounting in the inner backrest bearing, in the same operation as the introduction of the bearing bushes into the outer backrest bearings. The outer backrest bearings preferably denote the two outer bearing points as viewed in the transverse direction. Here, the holding element which can be screwed closes, in particular, an introduction opening of the inner backrest bearing and, as a result, prevents that part of the backrest structure which is introduced into the inner backrest bearing from escaping again.

In a further possible method step, pivoting of the backrest structure into an upright position can be provided, as a result of which the backrest structure can be moved into a substantially upwardly directed position which is usually also called the use position, in order, after the mounting of the backrest structure, to supply the motor vehicle for further vehicle assembly. Here, furthermore, a desired operating connection of the blocking section of the bearing bush together with the blocking element of the backrest bearing can however first of all advantageously be checked by the worker who is commissioned with mounting.

Furthermore, pivoting back of the backrest structure about the bearing axis can preferably take place until a backrest latch which is arranged in the region of the backrest upper edge passes into engagement with a vehicle body-side holding means, preferably a pin and/or bracket, or else a backrest-side holding means passes into engagement with a vehicle body-side latch. As a result, the backrest structure is secured in the folded-back position, and uncontrolled forward folding of the backrest structure is advantageously prevented.

Furthermore, it can be provided according to one possible method step that the pivoting-out of the backrest structure takes place by at least one predefined angle, preferably an angle in the range from 80° to 90°. Here, said angle can be related, in particular, to the orientation of the backrest structure during the introduction into the outer backrest bearings or to the orientation of the backrest structure in the folded-back position.

Furthermore, the object which forms the basis is achieved according to the invention by way of a pivot support of a backrest structure of a vehicle rear seat, which backrest structure can be folded over, has a cylindrical bearing pin which is arranged in a lower lateral corner section of a backrest structure, and a vehicle body-side backrest bearing which in turn has a recess with an upwardly directed opening. During the mounting of the backrest structure, the bearing pin can be introduced through the opening into the recess. Furthermore, a bearing bush is arranged on the bearing pin, it being possible for the bearing bush together with the bearing pin to be introduced into a recess of the backrest bearing, and the bearing bush preventing a removal of the bearing pin out of the recess, by way of a rotation of the bearing bush about the bearing pin.

This provides the advantage of holding and likewise of securing the bearing pins in the backrest bearings by means of the bearing bushes which can preferably be manufactured from plastic. Here, during the mounting and, in particular, during the rotation of the bearing bushes about the bearing axis of the bearing bolts, no further tool is advantageously required, and the worker who is performing the mounting operation also does not have to reach with his/her hands into the tightly assembled region between the backrest structure and the vehicle body, in particular in the region of the backrest bearings, in order to possibly manually rotate the bearing bushes. As a result, the work safety is accordingly likewise increased for the worker and injuries are avoided.

Furthermore, the pivot support can provide that the backrest structure has in each case one cylindrical bearing pin with an arranged bearing bush at the two lower lateral corner sections which lie opposite one another. The bearing pin is preferably of circular-cylindrical configuration. As a result, the backrest structure can be mounted and locked on both sides in the same advantageous way, and the bearing pin can be secured in the backrest bearings.

Moreover, it can be provided, furthermore, that the bearing bushes of the pivot support are of identical configuration and/or are arranged symmetrically with respect to a mirror plane which is oriented perpendicularly with respect to the bearing axis. A configuration of the two bearing bushes as identical parts provides, in particular as a result of a dual use of one identical part, the advantage of manufacturing the bearing bush in higher numbers, as a result of which, for example, the manufacturing costs can be reduced, furthermore. A configuration of the two bearing bushes such that they differ from one another can optionally be necessary and likewise be of advantage on account of external circumstances, such as the respective installation situation.

Furthermore, the pivot support can be set up, in particular, to carry out a method for mounting a backrest structure as claimed in one of the method claims, and/or in accordance with the preceding description. Here, the abovementioned advantages of the respective method which is carried out are likewise bestowed on the pivot support, for which reason reference is made at this point to the description in this regard.

As an alternative or in addition, the bearing bush can be arranged on the bearing pin in a predefined orientation and such that it is secured against rotation relative to the bearing pin up to a predetermined holding force. Here, the bearing bush is held automatically in the correct orientation for the introduction into the backrest bearings, as a result of which the introduction of the backrest pins into the backrest bearings is simplified. Here, however, the holding force is dimensioned in such a way that it can be overcome with low resistance, for example, when folding back the backrest structure which is inserted into the backrest bearing, and the bearing bush accordingly remains in the rotated position.

The pivot support can provide, furthermore, that a blocking section which is arranged on the bearing bush can be brought into engagement with a blocking element of the vehicle body-side backrest bearing by way of a rotation of the backrest structure. A blocking securing action of this type of the bearing bush ensures that the bearing bush cannot be rotated into the original orientation for the introduction of the backrest structure into the recess of the backrest bearing, and/or likewise cannot be removed again out of the backrest bearing unintentionally in this orientation, even in the case of later repeated folding out and folding back of the backrest structure, as usually occurs many times over the service life of the motor vehicle.

It can likewise be provided in the case of the pivot support that the bearing bush is of sprung configuration at least in a region of the blocking section and acts in a self-securing manner when it is operatively connected to a blocking element of the vehicle body-side backrest bearing. Here, the physical material property of the material which is preferably formed from a plastic and from which the bearing bush is manufactured can be utilized, in particular, in order to set this effect in a targeted manner. An additional fixing means, such as a screw, for securing the bearing bush against rotation can advantageously be dispensed with, however, which once again advantageously reduces the mounting complexity.

In particular, it can likewise be provided that a further inner backrest bearing is provided between the two vehicle body-side outer backrest bearings, which inner backrest bearing can serve, in particular, for further extensive stabilization and load suspension in the case of very wide backrest structures, and preferably serves for mounting the backrest structure in the transverse direction of the backrest structure or the axial direction of the bearing pins. This likewise advantageously makes it possible for the backrest structure per se to be manufactured from a thinner and lighter material on account of the additionally stabilizing load suspension point.

Furthermore, a blocking element can advantageously be provided which is preferably inset as a depression and/or opening in the surface of the backrest bearing or which projects out of a surface of the backrest bearing. As a result, different configurations of the blocking element can be realized which can advantageously interact with the blocking section of the bearing bush.

Here, it can be advantageous, furthermore, if the blocking section of the bearing bush has a hook-shaped end section, as a result of which a particularly advantageous action is made possible in conjunction with a blocking element in the form of an inset opening.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the figures:

FIG. 7b is a diagrammatic sectional illustration of the backrest bearing according to FIG. 7a;

FIG. 9 is an exploded illustration of an outer backrest bearing and a bearing bush.

DESCRIPTION OF THE PREFERRED EMBODIMENTS

Figure 1:
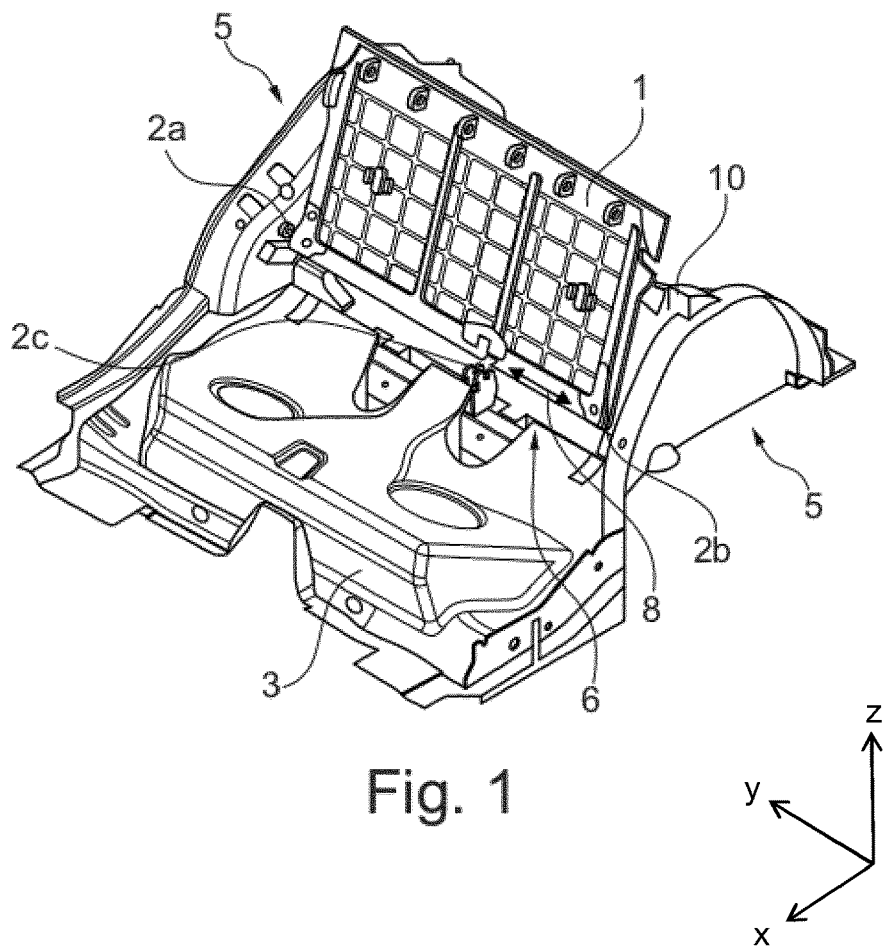
FIG. 1 is a backrest structure before the mounting into the backrest bearings.

Referring to the drawings, the features which are disclosed in the above description, the claims and the drawings can be of significance both individually and in combination for the realization of the invention in its different embodiments.

The backrest structure (shown diagrammatically in the following figures) of a vehicle seat is described using three spatial directions which run perpendicularly with respect to one another. In the case of a vehicle seat which is installed in the vehicle, a longitudinal direction x runs largely horizontally and preferably parallel to a vehicle longitudinal direction which corresponds to the usual driving direction of the vehicle. A transverse direction y which runs perpendicularly with respect to the longitudinal direction x is likewise oriented horizontally in the vehicle and runs parallel to a vehicle transverse direction. A vertical direction z runs perpendicularly with respect to the longitudinal direction x and perpendicularly with respect to the transverse direction y. In the case of a vehicle seat which is installed in the vehicle, the vertical direction z runs parallel to the vehicle vertical axis.

The positional and directional specifications which are used, such as front, rear, top and bottom, relate to a viewing direction of an occupant seated in the vehicle seat in a normal seat position, the vehicle seat being installed in the vehicle, in a use position which is suitable for conveying persons with an upright seat backrest, and being oriented in the driving direction as is customary.

FIGS. 1 to 3a in each case show a backrest structure 1 before, during and after mounting of the latter in vehicle body-side backrest bearings 2a, 2b, 2c which are provided. Here, in the present case, three backrest bearings 2a, 2b, 2c are provided in a vehicle body structure 3, in particular, of which backrest bearings two are configured in each case as a backrest bearing 2a, 2b which is arranged in an outer region 5 of the vehicle body structure 3. The remaining third backrest bearing 2c is arranged in an inner region 6 of the vehicle body structure 3, which inner region 6 is defined between the outer backrest bearings 2a, 2b. In the case of a laterally divided backrest structure 1, in which a backrest part, as viewed in the transverse direction y, has approximately 60% of the overall width of the backrest structure 1 and a further backrest part correspondingly has approximately 40% of the overall width, it can likewise be provided that the inner backrest bearing 2c is arranged in the same 60% to 40% ratio according to its spacing 8, in the present case from the outer backrest bearing 2b.

FIG. 1 shows, in particular, a starting state during the mounting of the backrest structure 1, in which starting state the backrest structure 1 has not yet been received in the backrest bearings 2a, 2b, 2c. First of all, a bearing bush 15 is arranged, in particular is plugged and/or clipped, on in each case one cylindrical bearing pin 11 which is provided in the lower lateral corner section of the backrest structure 1. The backrest structure 1 is guided substantially in the vertical direction from above onto the three backrest bearings 2a, 2b, 2c. Here, the backrest structure 1 is oriented substantially vertically, a slight inclination for improved visibility of the backrest bearings 2a, 2b, 2c not being ruled out. It is to be ensured here, however, that the backrest structure 1 is not disrupted by way of possibly provided further holding means 10 on the vehicle body structure 3, in this regard see FIG. 4e, for example.

Figure 2:
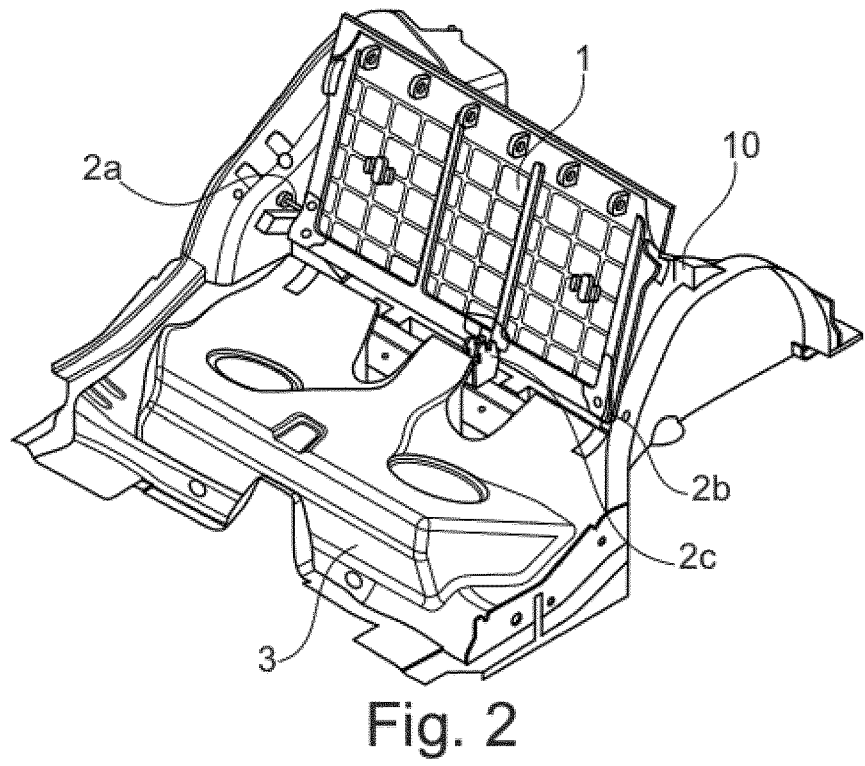
FIG. 2 is a backrest structure after the insertion into the backrest bearings.

FIG. 2 shows the same backrest structure 1 according to FIG. 1 after an introduction of the bearing bushes 15 into in each case one recess 17 of the vehicle body-side backrest bearings 2a, 2b, as a result of which corresponding bearing pins 11 of the backrest structure 1 are then mounted in the vehicle body-side backrest bearings 2a, 2b. In the present case, the outer backrest bearings 2a, 2b are formed by means of a shaped part which is made from sheet metal, is preferably profiled in a U-shape and is welded onto the vehicle body of the motor vehicle. In this state, however, the backrest structure 1 can likewise be removed again out of the backrest bearings 2a, 2b and the backrest bearing 2c by way of the recess 17.

Figure 3A:
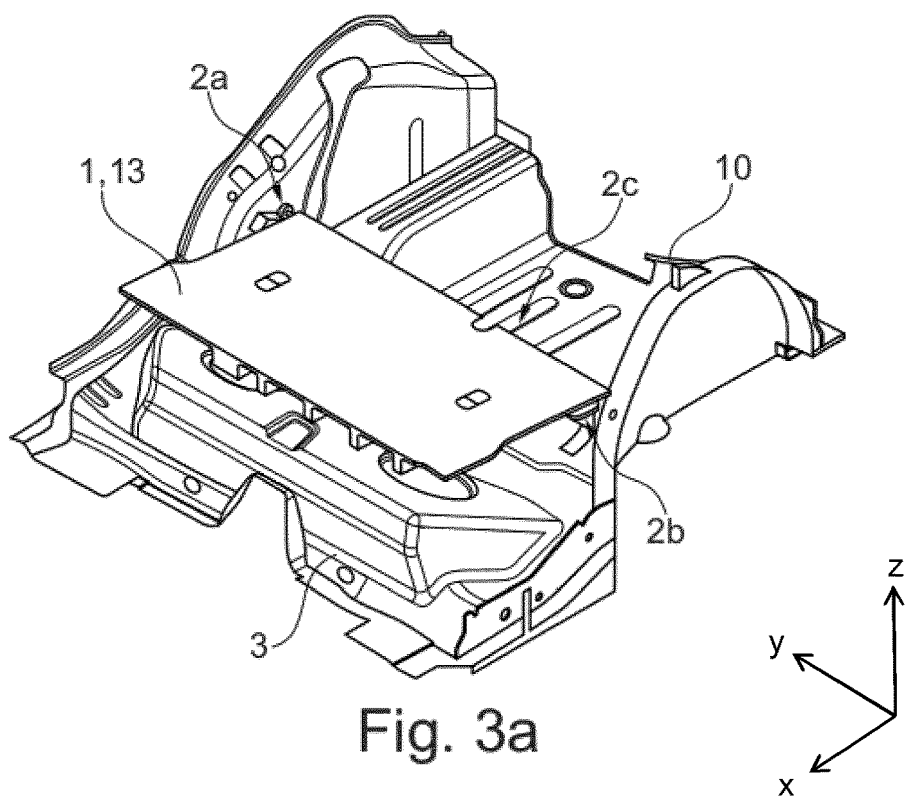
FIG. 3a is a backrest structure during the locking of the backrest structure in the backrest bearings.
Figure 3B:
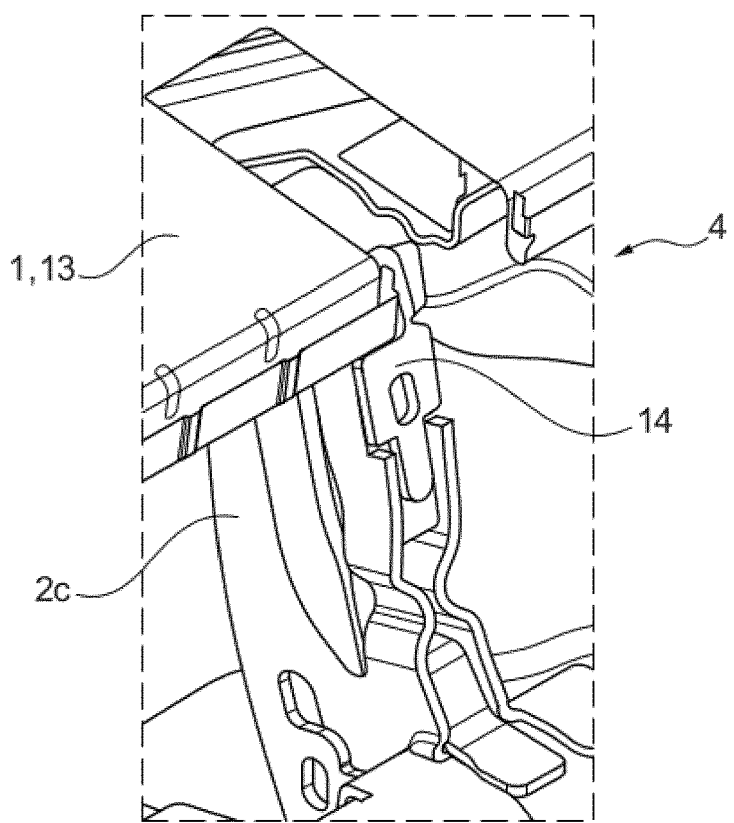
FIG. 3b is a perspective illustration of the inner backrest bearing with an inserted backrest structure.

FIG. 3a shows a next step for mounting the backrest structure 1, with a backrest structure 1 which is pivoted forward. After the pivoting out of the backrest structure 1 which is introduced into the backrest bearing 2a, 2b, about a bearing axis 12 of the bearing pins 11, a blocking section 22b of the bearing bush 15 latches into a blocking element 22a of the backrest bearing 2a, 2b or engages behind it. It is provided here, in particular, that the pivoting out takes place until the blocking section 22b and the blocking element 22a pass into an operative connection with one another. The backrest structure 1 which has previously been inserted into the backrest bearings 2a, 2b, 2c is preferably pivoted forward about the bearing axis 12 which is formed by way of the bearing pins 11, in order in this way to lock the bearing pins 11 in the backrest bearings 2a, 2b. Here, pivoting out of the backrest structure 1 by at least one predefined angle, preferably an angle in the range from 80° to 90°, is provided. Here, furthermore, an additional recess in the backrest structure 1 in the region of the middle backrest bearing 2c becomes accessible from the rear side 13 of the backrest structure 1, in order, for example, to attach a holding element 14 there for securing the middle backrest bearing 2c, as shown, in particular, in FIG. 3b. Subsequently, the backrest structure 1 can be pivoted again into an upright position, the pivoting back of the backrest structure 1 taking place about the bearing axis 12 until a backrest latch which is arranged in the region of the backrest upper edge passes into engagement with a vehicle body-side holding means 10, preferably in the form of a pin or bracket, or else a backrest-side holding means 10 passes into engagement with a vehicle body-side latch. A holding means 10 of this type is shown, for example, in FIG. 4e.

Figure 4A:
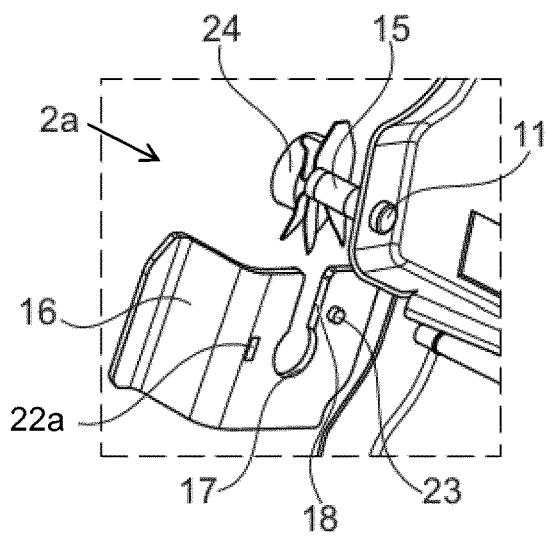
FIG. 4a is an enlarged partial illustration of an outer backrest bearing before the mounting.
Figure 4B:
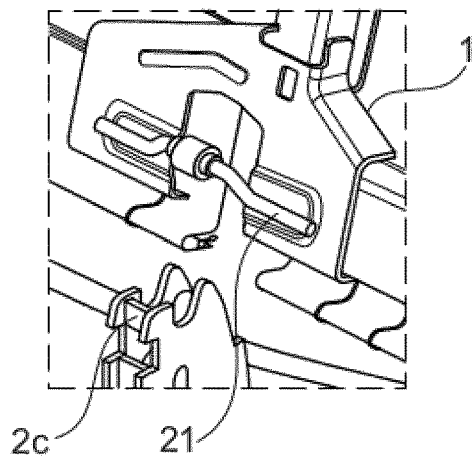
FIG. 4b is an enlarged partial illustration of the inner backrest bearing before the mounting.
Figure 4C:
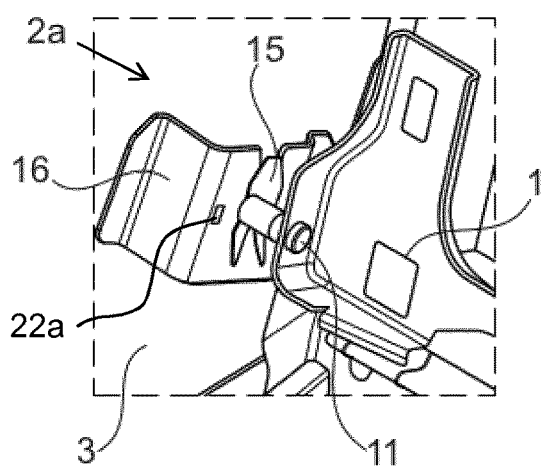
FIG. 4c is an enlarged partial illustration of an outer backrest bearing with an inserted backrest structure.
Figure 4D:
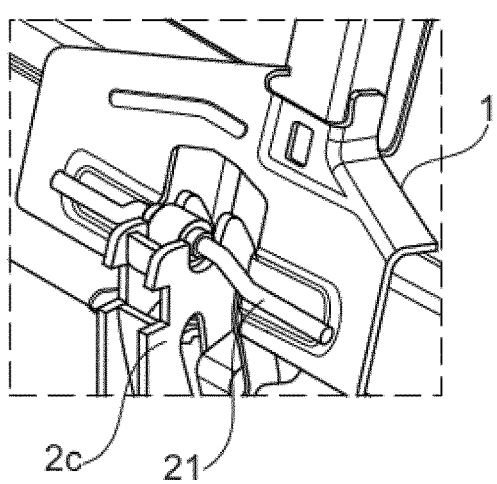
FIG. 4d is an enlarged partial illustration of the inner backrest bearing with an inserted backrest structure.

FIGS. 4a to 4e show an enlarged partial illustration of the outer backrest bearing 2a and the inner backrest bearing 2c during mounting. In the following text, general interconnections and functions will be described by way of example using the outer backrest bearing 2a; unless mentioned expressly, this likewise applies to the outer backrest bearing 2b on account of the preferably symmetrical configuration. The illustration of FIG. 4a shows the outer backrest bearing 2a and a bearing bush 15 which cooperates with it. FIG. 4b shows the inner backrest bearing 2c with the backrest structure 1 in the same situation as FIG. 4a. The pivot support which is shown of a backrest structure 1 of a vehicle rear seat, which backrest structure 1 can be folded over, has a cylindrical bearing pin 11 which is arranged in the lower lateral corner section and is assigned a recess 17 of the vehicle body-side backrest bearing 2a, into which recess 17 the bearing pin 11 is introduced during the mounting of the backrest structure 1. Furthermore, the recess 17 has an upwardly directed opening 18, through which the bearing pin 11 can be introduced into the recess 17 during the mounting of the backrest structure 1. Here, a bearing bush 15 is arranged on the bearing pin 11, it being possible for the bearing bush 15 together with the bearing pin 11 to be introduced into the recess 17 of the backrest bearing 2a, and the bearing bush 15 preventing a removal of the bearing pin 11 out of the recess 17, by way of a rotation of the bearing bush 15 about the bearing pin 11.

As has already been described, the backrest bearing 2b which lies opposite the backrest bearing 2a which is shown in FIG. 4a is preferably of identical configuration, but oriented in a mirror-symmetrical orientation; in particular, at its two lower lateral corner sections which lie opposite one another, the backrest structure 1 has in each case one cylindrical bearing pin 11 with a bearing bush 15 arranged thereon. The configuration, alignment and orientation of the two outer backrest bearings 2a, 2b and of the two bearing bushes 15 on the bearing pins 11 with respect to one another is preferably symmetrical with respect to a mirror plane perpendicularly with respect to the bearing axis 12 which is defined by way of the two coaxially arranged bearing pins 11 which lie opposite one another. Here, the two bearing bushes 15 which lie opposite one another are of identical configuration and are arranged symmetrically with respect to the backrest structure 1. It can be gathered here in detail from FIG. 4a that the outer backrest bearing 2a has an upwardly open recess 17. Furthermore, a bearing bush 15 is arranged on the backrest-side bearing pin 11, which bearing bush 15 is aligned on the respective bearing pin 11 for insertion of the bearing pins 11 into the backrest bearing 2a, in such a way that at least two, preferably four, wings 19 on the bearing bush 15 which project perpendicularly with respect to the bearing axis 12 of the bearing pin 11 point in the direction of the backrest bearing 2a, 2b. A particularly precise introduction of the bearing pins 11 with the bearing bushes 15 into the recesses 17 of the backrest bearings 2a, 2b is advantageously aided by in each case one bevel 20 in the upper region of the opening 18 of the respective recess 17 for centering in the longitudinal direction x, and in the transverse direction y by way of the wings 19 which lie obliquely with respect to one another. The inner backrest bearing 2c according to FIG. 4b likewise has a bevel 20 of the opening 18 for receiving a bearing wire 21. A configuration of the inner backrest bearing 2c for receiving one or two bearing pins (not shown), for example in the case of a divided backrest structure 1 (not shown), is likewise conceivable.

If the bearing pins 11 and/or the bearing wire 21 of the backrest structure 1 are/is introduced into the corresponding backrest bearings 2a, 2b, 2c, the backrest structure 1 is positioned both in the longitudinal direction x and in the vertical direction z via the outer backrest bearings 2a, 2b by means of the bearing bushes 15.

In the case of a divided backrest structure 1 (not shown), fixing of the divided backrest structure 1 in the transverse direction y takes place separately for each part, preferably by means of one of the respective outer backrest bearings 2a, 2b or a respective dedicated inner backrest bearing. In contrast, in the case of a continuous backrest structure 1, the pivot support is possibly overdetermined; in this case, preferably exclusively, the inner backrest bearing 2c with the bearing wire 21 which is shown in the present case therefore takes over additional fixing in the transverse direction y, whereas the outer backrest bearings 2a, 2b serve for fixing in the longitudinal direction x and in the vertical direction z.

Figure 4E:
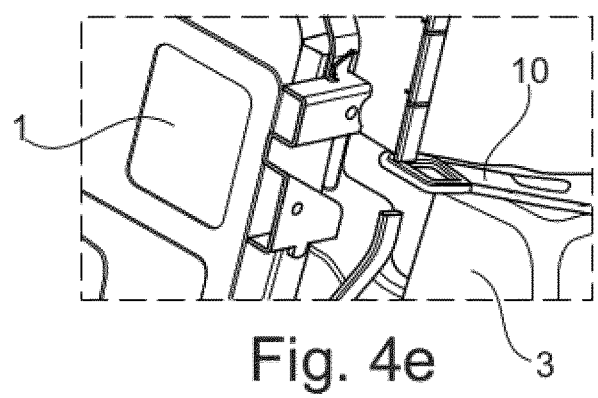
FIG. 4e is a diagrammatic partial illustration of a region of the backrest upper edge.

The illustration of FIG. 4a shows a diagrammatic partial illustration of a region of the backrest upper edge, the backrest structure 1 being oriented vertically during the insertion into the backrest bearings 2a, 2b, 2c, in such a way that the backrest structure 1 is not impeded, for example, by a holding element 10 which is provided on the vehicle body side, during the insertion of the bearing pins 11 into the backrest bearings 2a, 2b. In the present case, the holding element 10 which is shown in FIG. 4e can be, for example, part of a locking apparatus of the backrest.

Figure 5A:
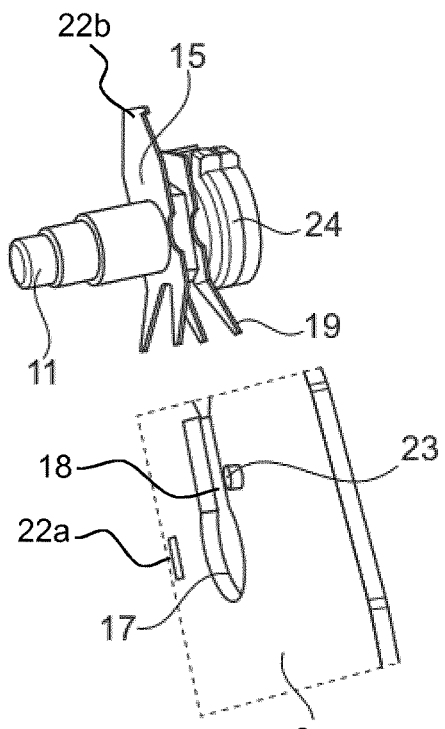
FIG. 5a is a diagrammatic partial illustration of an outer backrest bearing in one of different situations during the introduction of the bearing pin.
Figure 5B:
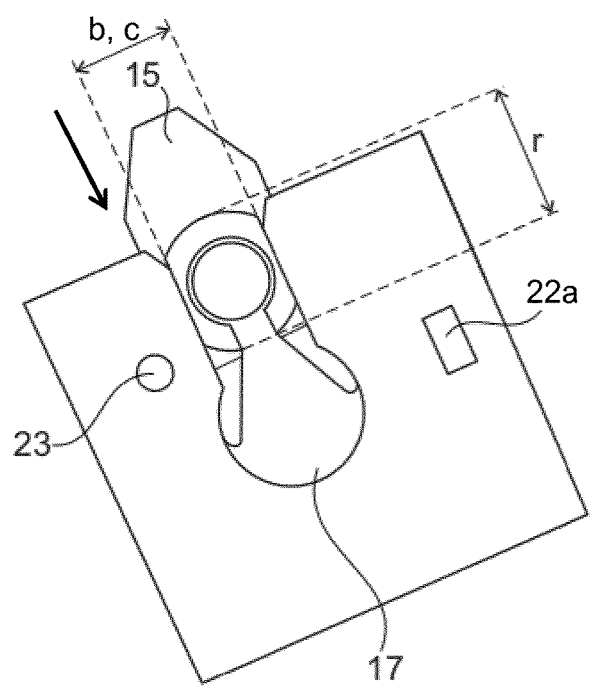
FIG. 5b is a diagrammatic partial illustration of an outer backrest bearing in another of different situations during the introduction of the bearing pin.
Figure 5C:
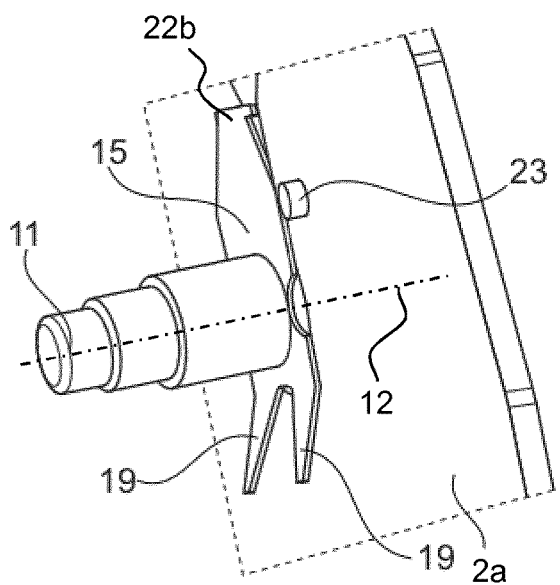
FIG. 5c is a diagrammatic partial illustration of an outer backrest bearing in another of different situations during the introduction of the bearing pin.

The illustrations in FIGS. 5a to 5c show in each case one diagrammatic partial illustration of an outer backrest bearing in different situations during the introduction of the bearing pin into the outer backrest bearings 2a, 2b, as shown in an overview in FIGS. 1 and 2. Thus, FIG. 5a first of all shows a perspective view of a bearing pin 11 with a bearing bush 15 plugged onto it, as can be plugged in a manner which follows the direction of the arrow into the opening 18 of the recess 17 in the backrest bearing 2a, 2b. A section through the bearing bush 15 during the passage through the opening 18 of the recess 17 in the backrest bearing 2a, 2b can be gathered in detail from the further sectional illustration of FIG. 5b. The bearing bush 15 is flattened on the sides as viewed in the introduction direction (shown as the direction of the arrow), with the result that the bearing bush 15 has a predefined width b in the introduction direction in the region of the flattened portion. The width b in sections of the bearing bush 15 is correspondingly smaller than or approximately equal to the width c of the opening 18 of the recess 17. In contrast, in the region of the lateral flattened portions, the bearing bush 15 has a longitudinal extent, perpendicularly with respect to the flattened portions in the sectional plane which is shown, with a radius r which corresponds substantially to an internal diameter of the recess 17 and, furthermore, is greater than the width c of the opening 18 of the recess 17. FIG. 5c in turn shows the completely introduced bearing pin 11 in the backrest bearing 2a, 2b.

That embodiment of the bearing bush 15 which is shown in FIGS. 5a to 5c has a hook-shaped end section which is arranged on a blocking section 22b and can be brought into engagement with a blocking element 22a of the vehicle body-side backrest bearing 2a, 2b, in particular, by way of a rotation of the bearing bush 15. Here, the blocking element 22a is configured, in particular, in the form of an engagement opening in the backrest bearing 2a, 2b.

Figure 5D:
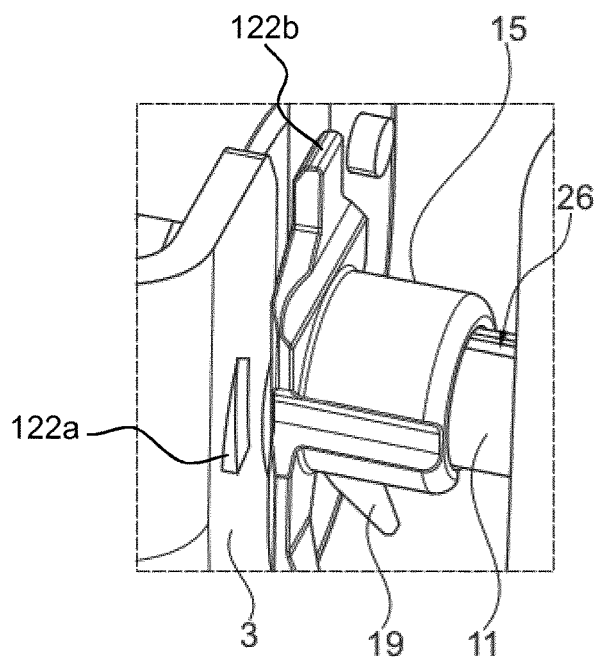
FIG. 5d is a diagrammatic partial illustration of an inserted bearing bush according to an alternative embodiment.

According to that embodiment of the bearing bush 15 which is shown in FIG. 5d, said bearing bush 15 is positioned on the bearing pin 11 in a predefined orientation and is secured against a rotation relative to the bearing pin 11 up to a predetermined holding force. In the present case, said anti-rotation safeguard which acts up to the predetermined holding force is brought about by means of a groove 26 in interaction with a tongue which is provided in the bearing bush 15 and is not visible for illustrative reasons. Said tongue/groove connection can likewise stipulate the positioning and/or orientation of the bearing bush 15 before the introduction into the backrest bearings 2a, 2b. The bearing bush 15 is preferably of sprung configuration at least in the region of the blocking section 22b, with the result that said bearing bush 15 is self-securing by means of the sprung action in conjunction with the blocking element 22a of the vehicle body-side backrest bearing 2a, 2b.

Furthermore, the diagrammatic partial illustration (shown in FIG. 5d) of a bearing bush 15 which is inserted into the backrest bearing 2a shows an alternative embodiment of the bearing bush 15 and of the backrest bearing 2a. The bearing bush 15 has a substantially straight blocking section 122b which is set up, in particular, to engage behind a blocking element 122a of the vehicle body-side backrest bearing 2a by way of a rotation of the bearing bush 15. Here, the blocking element 122a has, in particular, a wedge-shaped form which projects out of the surface of the backrest bearing 2a with a bearing face in the region of a predefined blocked position, in particular rotated by 90° with respect to the original orientation shown of the bearing bush 15 during the introduction into the backrest bearing 2a. The bearing bush 15 is of sprung configuration, preferably at least in the region of the blocking section 122b, with the result that the blocking section 122b is self-securing on account of the sprung action in conjunction with the blocking element 122a of the vehicle body-side backrest bearing 2a. During the rotation of the bearing bush 15, the blocking section 122b follows the contour of the wedge-shaped blocking element 122a and is pressed here away from the backrest bearing 2a with a slight force as viewed in the axial direction. If the blocking section 122b of the bearing bush 15 is rotated completely over the blocking element 122 of the backrest bearing 2a, the blocking section 122b springs back in the direction of the backrest bearing 2a and comes to lie on the side of the bearing face of the blocking element 122a. This achieves the advantage, in particular, that destruction-free dismantling is possible, by it being possible for the front locked part to be lifted up by means, for example, of a knife or screwdriver, and for the bearing bush to be unlocked and unscrewed in this way.

Figure 6A:
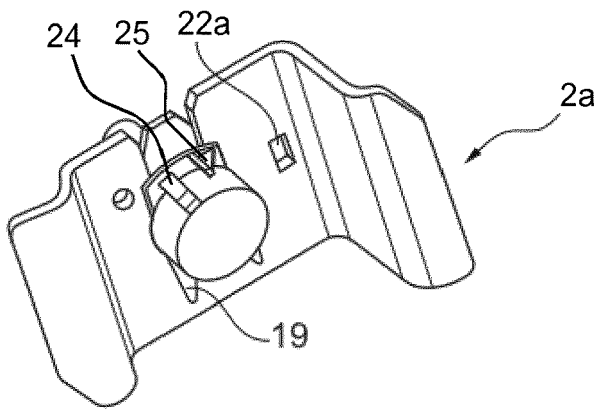
FIG. 6a is a diagrammatic illustration of an outer backrest bearing in one of different situations during the locking of the backrest structure.
Figure 6B:
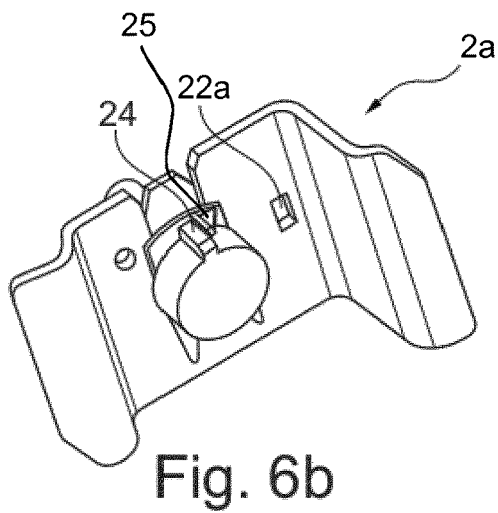
FIG. 6b is a diagrammatic illustration of an outer backrest bearing in another of different situations during the locking of the backrest structure.
Figure 6C:
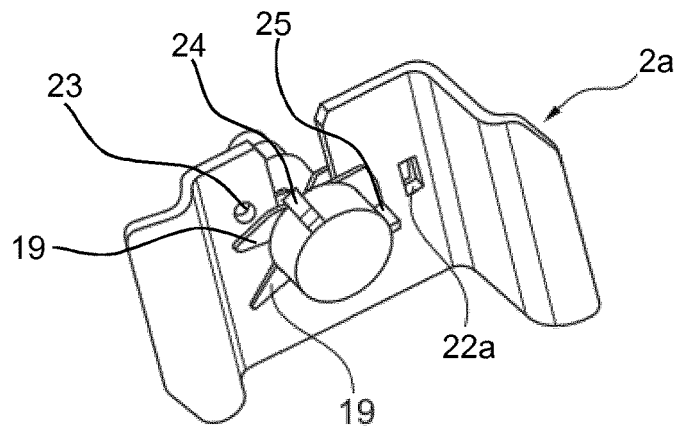
FIG. 6c is a diagrammatic illustration of an outer backrest bearing in another of different situations during the locking of the backrest structure.

FIGS. 6a to 6c show an illustration of the outer backrest bearing 2a in each case one situation during the locking of the backrest structure 1. Here, FIG. 6a first of all shows the bearing pin 11 which is introduced into the recess 17 of the backrest bearing 2a and has a locking driver 24 which passes into contact with a locking pin 25 on the bearing bush 15 by way of pivoting out of the backrest structure 1. FIG. 6b shows that, during further pivoting out of the backrest structure 1, the locking driver 24 drives the bearing bush 15 in a rotational movement about the bearing axis 12, and the bearing bush 15 rotates about the bearing axis 12 of the bearing pin 11, until the bearing bush 15 latches with a blocking element 22a in the outer backrest bearing 2a by means of the blocking section 22b which is provided on the bearing bush 15, and is fixed in said position. As a result, the bearing bush 15 is preferably rotated at an angle of 90° with respect to the opening 18 of the recess 17 of the backrest bearing 2a, 2b, as a result of which the bearing bush 15 is blocked against exiting again from the recess 17. FIG. 6c shows the continuance of the fixed bearing bush 15 in the locked position, whereas the bearing pin 11 is pivoted back again together with the locking driver 24.

Figure 7A:
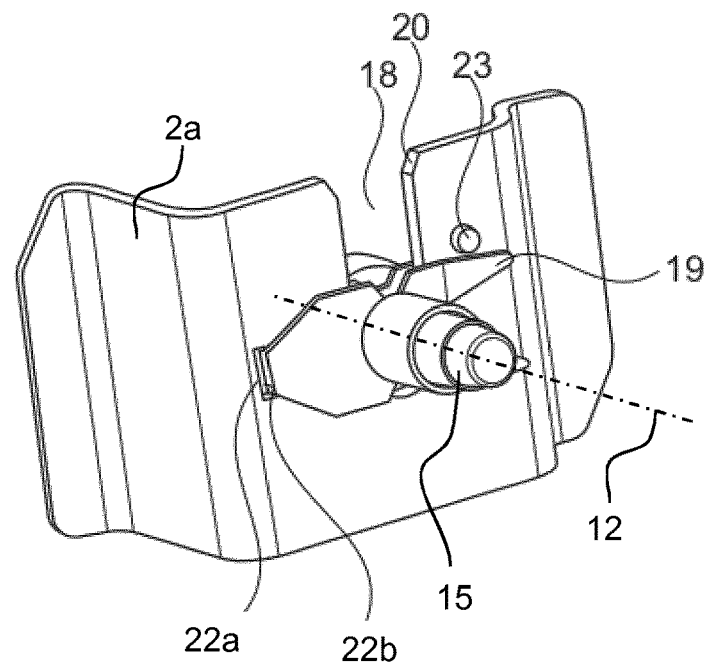
FIG. 7a is a diagrammatic illustration of an outer backrest bearing in the locked position.
Figure 7B:
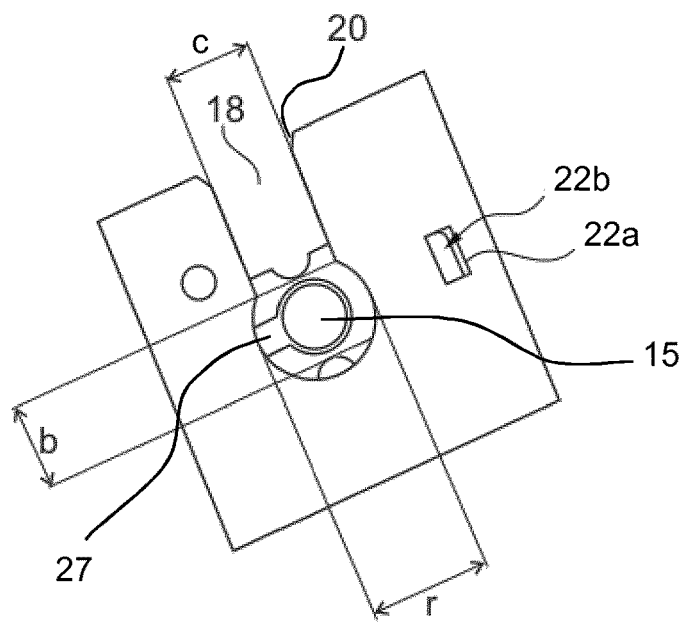

FIG. 7a shows an illustration of the outer backrest bearing 2a with the bearing bush 15 in the locked position, from a viewing angle which is different than FIG. 6c. It can be gathered from the illustration here, in particular, that the backrest bearing 2a has, on the other side of the recess 17, a stop 23 which lies opposite the blocking element 22a and prevents the bearing bush 15 from rotating excessively about the bearing axis 12 of the bearing pin 11, as soon as the stop 23 passes into contact with a wing 19 of the bearing bush 15. In addition, FIG. 7b shows a sectional illustration of the locked state of the bearing bush 15 in the recess 17; it can be seen that the bearing bush 15 which is oriented in said position cannot exit out of the recess 17 through the opening 18 of the width c, in accordance with its radius r.

Figure 8A:
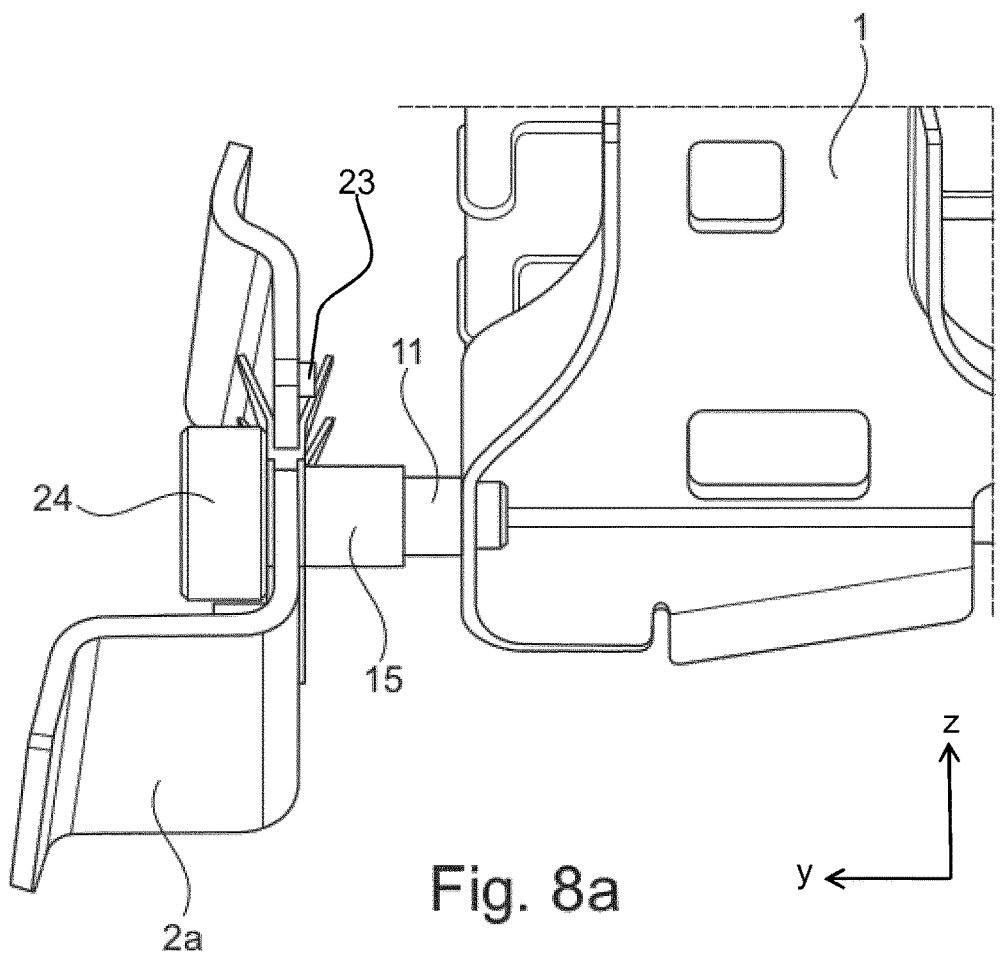
FIG. 8a is a diagrammatic illustration of a corner section of the backrest structure.

Furthermore, FIG. 8a shows an enlarged diagrammatic illustration of a corner section of the backrest structure 1. The bearing pin 11 is preferably connected by means of a welded joint to the corner section of the backrest structure 1. In the outer backrest bearing 2a, the backrest structure 1 has lateral securing of the backrest structure 1 in the transverse direction y by means of the locking driver 24 which is arranged at the free end of the bearing pin 11.

Figure 8B:
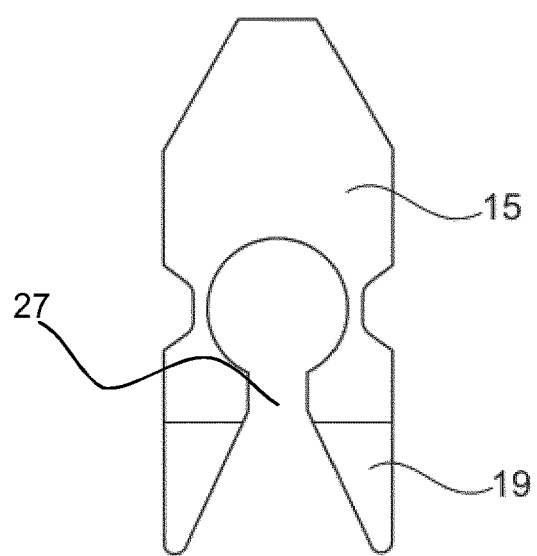
FIG. 8b is a cross section of the bearing bush.

FIG. 8b shows a cross section of the bearing bush 15 which preferably has a slot 27 which is arranged between the wings 19 for plugging onto the bearing pin 11 in the radial direction. In order to obtain the necessary flexibility and for it to be possible to be plugged or clipped onto the bearing pin 11, the bearing bush 15 is preferably manufactured from a plastic material. In addition, it is preferably provided that the bearing bush 15, after a welding operation which connects the bearing pin 11 to the backrest structure 1, is plugged onto the bearing pin 11, in order not to be impaired and/or deformed by way of the local heating of the bearing pin 11, which local heating takes place during the welding operation.

FIG. 9 shows an exploded illustration of an outer backrest bearing 2a and a bearing bush 15, it being possible for the locking driver 24 to be a disk-shaped element which can be attached fixedly to the free end of the bearing pin 11 so as to rotate with it, by means of a fixing element 28, for example a screw or a threaded bolt.

While specific embodiments of the invention have been shown and described in detail to illustrate the application of the principles of the invention, it will be understood that the invention may be embodied otherwise without departing from such principles.

The invention claimed is:

1. A method for mounting a backrest structure of a vehicle rear seat, the method comprising the steps:
arranging a bearing bush around a cylindrical bearing pin which is provided in a lower lateral corner section of a backrest structure;
introducing the bearing bush together with the bearing pin into a recess of a vehicle body-side backrest bearing; and
pivoting out the backrest structure, which is introduced into the backrest bearing, about a bearing axis of the bearing pin until a blocking section of the bearing bush latches into a blocking element of the backrest bearing or engages behind the blocking element of the backrest bearing or latches into the blocking element of the backrest bearing and engages behind the blocking element of the backrest bearing, the blocking section, after latching into or behind the blocking element, configures the bearing bush to prevent removal of the bearing pin from the recess independent of pivoting of the backrest structure.

2. The method as claimed in claim 1, further comprising arranging an inner backrest bearing between two vehicle body-side outer backrest bearings, and fixing the inner backrest bearing, in the pivoted-out state of the backrest structure by means of a holding element which can be screwed.

3. The method as claimed in claim 1, wherein:
the bearing bush is configured to have pivoting out of the backrest, after said introducing, cause prevention of removal of the bearing bush from the recess after said pivoting out.

4. A pivot support of a backrest structure of a vehicle rear seat, which backrest structure can be folded over, the pivot support comprising:
a cylindrical bearing pin arranged in a lower lateral corner section of a backrest structure;
a vehicle body-side backrest bearing which has a recess with an upwardly directed opening defining a path for the bearing pin to be introduced through the opening into the recess during the mounting of the backrest structure; and
a bearing bush arranged around the bearing pin the bearing bush being introducable together with the bearing pin into the recess of the backrest bearing, the bearing bush preventing a removal of the bearing pin out of the recess, by way of a rotation of the bearing bush about the bearing pin, the blocking section, after latching into or behind the blocking element, configures the bearing bush to prevent removal of the bearing pin from the recess independent of pivoting of the backrest structure.

5. The pivot support as claimed in claim 4, wherein the backrest bearing comprises a blocking element and the pivot support is configured for a method for mounting a backrest structure comprising the steps:
arranging the bearing bush on the cylindrical bearing pin which is provided in the lower lateral corner section of the backrest structure;
introducing the bearing bush into the recess of the vehicle body-side backrest bearing; and
pivoting out the backrest structure, which is introduced into the backrest bearing, about a bearing axis of the bearing pin until a blocking section of the bearing bush latches into the blocking element of the backrest bearing or engages behind the blocking element of the backrest bearing or latches into the blocking element of the backrest bearing and engages behind the blocking element of the backrest bearing.

6. The pivot support as claimed in claim 4, wherein the bearing bush is arranged on the bearing pin in a predefined orientation and such that the bearing bush is secured against rotation relative to the bearing pin up to a predetermined holding force.

7. The pivot support as claimed in claim 4, wherein the backrest bearing comprises a blocking element and the bearing bush comprises a blocking section arranged on the bearing bush and the blocking section is brought into engagement with a blocking element of the vehicle body-side backrest bearing by way of a rotation of the backrest structure.

8. The pivot support as claimed in claim 7, wherein a region of the blocking section is configured to be spring biased in a self-securing manner when the blocking section is operatively connected to the blocking element of the vehicle body-side backrest bearing.

9. The pivot support as claimed in claim 4, further comprising another cylindrical bearing pin in another lower lateral corner section of the backrest structure;
another vehicle body-side backrest bearing which has another bearing recess with an upwardly directed opening defining a path for the bearing pin to be introduced through the opening into the another bearing recess during the mounting of the backrest structure, whereby two vehicle body-side outer backrest bearings are provided;
another bearing bush arranged on the another cylindrical bearing pin the another bearing bush being introducable together with the another cylindrical bearing pin into the another bearing recess, the another bearing bush preventing a removal of the another cylindrical bearing pin out of the recess, by way of a rotation of the another bearing bush about the another cylindrical bearing pin;
a further inner backrest bearing provided between the two vehicle body-side outer backrest bearings.

10. The pivot support as claimed in claim 9, wherein the inner backrest bearing provides a support of the backrest structure in a transverse direction or in the axial direction of the bearing pins.

11. The pivot support as claimed in claim 10, wherein the outer backrest bearings provides a fixing in a longitudinal direction and in a vertical direction.

12. The pivot support as claimed in claim 4, wherein a blocking element is provided which is inset as a depression and/or opening in the surface of the backrest bearing.

13. The pivot support as claimed in claim 4, wherein a blocking element is provided which projects out of a surface of the backrest bearing.

14. The pivot support as claimed in claim 4, further comprising:
- another cylindrical bearing pin in another lower lateral corner section of the backrest structure;
- another vehicle body-side backrest bearing which has another bearing recess with an upwardly directed opening defining a path for the bearing pin to be introduced through the opening into the another bearing recess during the mounting of the backrest structure, whereby two vehicle body-side outer backrest bearings are provided;
- another bearing bush arranged on the another cylindrical bearing pin the another bearing bush being introducable together with the another cylindrical bearing pin into the another bearing recess, the another bearing bush preventing a removal of the another cylindrical bearing pin out of the recess, by way of a rotation of the another bearing bush about the another cylindrical bearing pin.

15. The pivot support as claimed in claim 14, wherein the bearing bushes are of identical configuration.

16. The pivot support as claimed in claim 14, wherein the bearing bushes are arranged symmetrically with respect to a mirror plane, which mirror plane is oriented perpendicularly with respect to the bearing axis.

17. The pivot support as claimed in claim 4, wherein:
the cylindrical bearing pin has a circular-cylindrical configuration.

* * * * *